United States Patent
Koseoglu et al.

(10) Patent No.: US 10,093,872 B2
(45) Date of Patent: *Oct. 9, 2018

(54) OXIDATIVE DESULFURIZATION OF OIL FRACTIONS AND SULFONE MANAGEMENT USING AN FCC

(71) Applicant: Saudi Arabian Oil Company, Dhahran (SA)

(72) Inventors: Omer Refa Koseoglu, Dhahran (SA); Abdennour Bourane, Dhahran (SA); Stephane Kressmann, Communay (FR)

(73) Assignee: SAUDI ARABIAN OIL COMPANY (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,276

(22) Filed: Feb. 20, 2017

(65) Prior Publication Data
US 2017/0158973 A1   Jun. 8, 2017

Related U.S. Application Data

(63) Continuation-in-part of application No. 12/876,702, filed on Sep. 7, 2010, now Pat. No. 9,574,144.

(51) Int. Cl.
  *C10G 55/06* (2006.01)
  *C10G 21/16* (2006.01)
  (Continued)

(52) U.S. Cl.
  CPC .............. *C10G 55/06* (2013.01); *B01J 23/28* (2013.01); *C10G 21/16* (2013.01); *C10G 21/20* (2013.01);
  (Continued)

(58) Field of Classification Search
  CPC ........ C10G 21/06; C10G 21/12; C10G 21/16; C10G 21/22; C10G 21/28;
  (Continued)

(56) References Cited

U.S. PATENT DOCUMENTS

| | | |
|---|---|---|
| 2,704,295 A | 3/1955 | Gilbert et al. |
| 2,993,841 A | 7/1961 | Sarno |

(Continued)

FOREIGN PATENT DOCUMENTS

| | | |
|---|---|---|
| WO | 0218518 A1 | 3/2002 |
| WO | 03014266 A1 | 2/2003 |
| WO | 2006071793 A1 | 7/2006 |

OTHER PUBLICATIONS

Skov, et al., The ULSD Oxidative Desulfurization Option, Hydrocarbon Engineering, 2007.*

(Continued)

*Primary Examiner* — Renee Robinson
*Assistant Examiner* — Derek N Mueller
(74) *Attorney, Agent, or Firm* — Bracwell LLP; Constance Gall Rhebergen

(57) ABSTRACT

Embodiments provide a method and apparatus for recovering components from a hydrocarbon feedstock. According to at least one embodiment, the method includes supplying a hydrocarbon feedstock to an oxidation reactor, wherein the hydrocarbon feedstock is oxidized in the presence of a catalyst under conditions sufficient to selectively oxidize sulfur compounds and nitrogen compounds present in the hydrocarbon feedstock, separating the hydrocarbons, the oxidized sulfur compounds, and the oxidized nitrogen compounds by solvent extraction, collecting a residue stream that includes the oxidized sulfur compounds and the oxidized nitrogen compound, and supplying the first residue stream to a fluid catalytic cracking unit. The first residue stream is further supplied through a hydrotreater prior to supplying the first residue stream to the fluid catalytic cracking unit.

36 Claims, 5 Drawing Sheets

(51) Int. Cl.
*C10G 21/20* (2006.01)
*B01J 23/28* (2006.01)

(52) U.S. Cl.
CPC ... *C10G 2300/202* (2013.01); *C10G 2300/44* (2013.01); *C10G 2300/701* (2013.01)

(58) Field of Classification Search
CPC ...... C10G 2300/1074; C10G 2300/202; C10G 2300/44; C10G 25/003; C10G 27/04; C10G 27/12; C10G 53/04; C10G 53/08; C10G 53/14; C10G 55/00
See application file for complete search history.

(56) References Cited

U.S. PATENT DOCUMENTS

| | | | |
|---|---|---|---|
| 3,617,525 A | 11/1971 | Moritz et al. | |
| 3,838,039 A | 9/1974 | Vesely et al. | |
| 3,856,870 A | 12/1974 | Hayes | |
| 4,440,629 A | 4/1984 | Stine | |
| 6,087,544 A | 7/2000 | Wittenbrink et al. | |
| 6,160,193 A * | 12/2000 | Gore | C10G 27/04 208/208 R |
| 6,174,178 B1 | 1/2001 | Reinhold | |
| 6,277,271 B1 | 8/2001 | Kocal | |
| 6,482,315 B1 | 11/2002 | Roberie et al. | |
| 6,620,311 B2 | 9/2003 | Morel et al. | |
| 6,793,804 B1 * | 9/2004 | Lindsay | C10G 65/04 208/210 |
| 6,841,062 B2 | 1/2005 | Reynolds | |
| 6,846,403 B2 | 1/2005 | Cheng et al. | |
| 6,923,903 B2 | 8/2005 | Chester et al. | |
| 7,094,332 B1 | 8/2006 | Kalnes et al. | |
| 7,276,152 B2 | 10/2007 | Lin et al. | |
| 7,291,259 B2 | 11/2007 | Gupta et al. | |
| 7,318,845 B2 | 1/2008 | Shaaban et al. | |
| 7,344,635 B2 | 3/2008 | Briot et al. | |
| 2003/0094400 A1 | 5/2003 | Levy et al. | |
| 2005/0150819 A1 | 7/2005 | Wachs | |
| 2005/0189261 A1 * | 9/2005 | Briot | C10G 53/14 208/243 |
| 2007/0051667 A1 * | 3/2007 | Martinie | C10G 27/00 208/208 R |
| 2007/0102323 A1 | 5/2007 | Lee et al. | |

OTHER PUBLICATIONS

Parkash, Refining Processes Handbook, 2003, Elevisier, pp. 114-128.*
Ebbe R. Skolv et al: "The USLD Oxidative Desulfurisation Option", Hydrocarbon Engineering (Reprinted from May 2007), May 31, 2007 pp. 1-5.
International Search Report and Written Opinion issued in PCT/US2011/050586, dated Nov. 22, 2011 (11 pages).
Parkash, "Gasoline Manufacturing Processes", Refining Processes Handbook, 2003, pp. 114-128, Elevisier.
PCT Written Opinion of the International Preliminary Examining Authority dated Feb. 1, 2013; International Application No. PCT/US2011/050586; International Filing Date: Sep. 7, 2011.

* cited by examiner

OXIDATIVE DESULFURIZATION OF OIL FRACTIONS AND SULFONE MANAGEMENT USING AN FCC

CROSS REFERENCE TO RELATED APPLICATION

This application is a continuation-in-part application of U.S. patent application Ser. No. 12/876,702 filed on Sep. 7, 2010, entitled "Process for Oxidative Desulfurization and Denitrogenation Using a Fluid Catalytic Cracking (FCC) Unit," which will issue as U.S. Pat. No. 9,574,144, on Feb. 21, 2017, and which is hereby incorporated by reference in its entirety into this application.

BACKGROUND

Field

Embodiments relate to a method and apparatus for recovering sulfur and nitrogen from a hydrocarbon feedstock. More specifically, embodiments relate to a method and apparatus for oxidative desulfurization and denitrogenation of a hydrocarbon stream and the subsequent disposal of resulting oxidized sulfur and nitrogen compounds.

Description of the Related Art

Crude oil is the world's main source of hydrocarbons used as fuel and petrochemical feedstock. At the same time, petroleum and petroleum-based products are also a major source for air and water pollution today. To address growing concerns surrounding pollution caused by petroleum and petroleum-based products, many countries have implemented strict regulations on petroleum products, particularly on petroleum-refining operations and the allowable concentrations of specific pollutants in fuels, such as the allowable sulfur and nitrogen content in gasoline fuels. While the exact compositions of natural petroleum or crude oils vary significantly, all crude oils contain some measurable amount of sulfur compounds and most crude oils also contain some measurable amount of nitrogen compounds. In addition, crude oils may also contain oxygen, but the oxygen content of most crude is low. Generally, sulfur concentrations in crude oils are less than about 5 percent by weight (wt %), with most crude oils having sulfur concentrations in the range from about 0.5 to about 1.5 wt %. Nitrogen concentrations of most crude oils are usually less than 0.2 wt %, but can be as high as 1.6 wt %. In the United States, motor gasoline fuel is regulated to have a maximum total sulfur content of less than 10 parts per million weight (ppmw) sulfur.

Crude oils are refined in oil refineries to produce transportation fuels and petrochemical feedstocks. Typically, fuels for transportation are produced by processing and blending of distilled fractions from the crude oil to meet the particular end use specifications. Because most of the crudes generally available today have high concentrations of sulfur, the distilled fractions typically require desulfurization to yield products, which meet various performance specifications, environmental standards, or both.

The sulfur-containing organic compounds present in crude oils and resulting refined fuels can be a major source of environmental pollution. The sulfur compounds are typically converted to sulfur oxides during the combustion process, which in turn can produce sulfur oxyacids and contribute to particulate emissions.

One method for reducing particulate emissions includes the addition of various oxygenated fuel blending compounds, compounds that contain few or no carbon-to-carbon chemical bonds, such as methanol and dimethyl ether, or both. Most of these compounds, however, suffer in that they can have high vapor pressures, are nearly insoluble in diesel fuel, or have poor ignition quality, as indicated by their cetane numbers, or combinations thereof.

Diesel fuels that have been treated by chemical hydrotreating or hydrogenation to reduce their sulfur and aromatics contents can have a reduced fuel lubricity, which in turn can cause excessive wear of fuel pumps, injectors, and other moving parts that come in contact with the fuel under high pressures.

For example, middle distillates (that is, a distillate fraction that nominally boils in the range of about 180-370° C.) can be used as a fuel, or alternatively can be used as a blending component of fuel for use in compression ignition internal combustion engines (that is, diesel engines). The middle distillate fraction typically includes between about 1 and 3 wt % sulfur. Allowable sulfur concentration in middle distillate fractions were reduced to 5-50 ppmw levels from 3000 ppmw level since 1993 in Europe and United States.

In order to comply with the increasingly stringent regulations for ultra-low sulfur content fuels, refiners must make fuels having even lower sulfur levels at the refinery gate so that they can meet the specifications after blending.

Low pressure conventional hydrodesulfurization (HDS) processes can be used to remove a major portion of the sulfur from petroleum distillates for the blending of refinery transportation fuels. These units, however, are not efficient to remove sulfur from compounds at mild conditions (that is, up to about 30 bar pressure), when the sulfur atom is sterically hindered as in multi-ring aromatic sulfur compounds. This is particularly true where the sulfur heteroatom is hindered by two alkyl groups (for example, 4,6-dimethyldibenzothiophene). Because of the difficulty in the removal, the hindered dibenzothiophenes predominate at low sulfur levels, such as 50 ppmw to 100 ppmw. Severe operating conditions (for example, high hydrogen partial pressure, high temperature, or high catalyst volume) must be utilized in order to remove the sulfur from these refractory sulfur compounds. Increasing the hydrogen partial pressure can only be achieved by increasing the recycle gas purity, or new grassroots units must be designed, which can be a very a costly option. The use of severe operating conditions typically results in decreased yield, lower catalyst life cycle, and product quality deterioration (for example, color), and therefore are typically sought to be avoided.

Conventional methods for petroleum upgrading, however, suffer from various limitations and drawbacks. For example, hydrogenative methods typically require large amounts of hydrogen gas to be supplied from an external source to attain desired upgrading and conversion. These methods can also suffer from premature or rapid deactivation of catalyst, as is typically the case during hydrotreatment of a heavy feedstock or hydrotreatment under harsh conditions, thus requiring regeneration of the catalyst or addition of new catalyst, which in turn can lead to process unit downtime. Thermal methods frequently suffer from the production of large amounts of coke as a byproduct and a limited ability to remove impurities, such as, sulfur and nitrogen. Additionally, thermal methods require specialized equipment suitable for severe conditions (for example, high temperature and high pressure), and require the input of significant energy, thereby resulting in increased complexity and cost.

Thus, there exists a need to provide a process for the upgrading of hydrocarbon feedstocks, particularly processes for the desulfurization, denitrogenation, or both, of hydrocarbons that use low severity conditions that can also provide means for the recovery and disposal of usable sulfur or nitrogen compounds, or both.

SUMMARY

Embodiments provide a method and apparatus for the upgrading of a hydrocarbon feedstock that removes a major portion of the sulfur and nitrogen present and in turn utilizes these compounds in an associated process.

According to at least one embodiment, there is provided a method of recovering components from a hydrocarbon feedstock, in which the method includes supplying the hydrocarbon feedstock to an oxidation reactor, wherein the hydrocarbon feedstock includes sulfur compounds and nitrogen compounds, and contacting the hydrocarbon feedstock with an oxidizing agent in the oxidation reactor under conditions sufficient to selectively oxidize sulfur compounds and nitrogen compounds present in the hydrocarbon feedstock to produce an oxidized hydrocarbon stream that includes hydrocarbons, oxidized sulfur compounds, and oxidized nitrogen compounds. The method further includes separating the hydrocarbons, the oxidized sulfur compounds, and the oxidized nitrogen compounds in the oxidized hydrocarbon stream by solvent extraction with a polar solvent to produce an extracted hydrocarbon stream and a mixed stream, the mixed stream including the polar solvent, the oxidized sulfur compounds, and the oxidized nitrogen compounds, wherein the extracted hydrocarbon stream has a lower concentration of sulfur compounds and nitrogen compounds than the hydrocarbon feedstock. The method further includes separating the mixed stream using a distillation column into a first recovered polar solvent stream and a first residue stream, wherein the first residue stream including the oxidized sulfur compounds and the oxidized nitrogen compounds, and supplying the first residue stream to a fluid catalytic cracking unit. The method further includes feeding the first residue stream through a hydrotreater prior to supplying the first residue stream to the fluid catalytic cracking unit. The fluid catalytic cracking unit is operative to catalytically crack the oxidized sulfur and the oxidized nitrogen to produce regenerated catalyst and gaseous and liquid products and allow for recovery of hydrocarbons from the first residue stream.

According to at least one embodiment, the method further includes recycling at least a portion of the liquid products to the oxidation reactor to selectively oxidize sulfur compounds in the liquid products, the portion of the liquid products comprising at least one of light cycle oils and heavy cycle oils.

According to at least one embodiment, the method further includes supplying the extracted hydrocarbon stream to a stripper to produce a second recovered polar solvent stream and a stripped hydrocarbon stream, and recycling the first recovered polar solvent stream and the second polar solvent stream to an extraction vessel for the separating the hydrocarbons, the oxidized sulfur compounds, and the oxidized nitrogen compounds in the oxidized hydrocarbon stream.

According to at least one embodiment, the method further includes recycling a portion of the regenerated catalyst with a fluid catalytic cracking feedstream to the fluid catalytic cracking unit, wherein the recycling further includes catalytically cracking the fluid catalytic cracking feedstream with the portion of the regenerated catalyst to recover the hydrocarbons from the first residue stream.

According to at least one embodiment, the oxidant is selected from the group consisting of air, oxygen, peroxides, hydroperoxides, ozone, nitrogen oxides compounds, and combinations thereof.

According to at least one embodiment, the contacting the hydrocarbon feedstock with an oxidizing agent occurs in the presence of a catalyst including a metal oxide having the formula $M_xO_y$, wherein M is an element selected from Groups IVB, VB, and VIB of the periodic table.

According to at least one embodiment, the sulfur compounds include sulfides, disulfides, mercaptans, thiophene, benzothiophene, dibenzothiophene, alkyl derivatives of dibenzothiophene, or combinations thereof.

According to at least one embodiment, the oxidation reactor is maintained at a temperature of between about 20 and about 350° C. and at a pressure of between about 1 and about 10 bars.

According to at least one embodiment, the ratio of the oxidant to sulfur compounds present in the hydrocarbon feedstock is between about 4:1 and about 10:1.

According to at least one embodiment, the polar solvent has a Hildebrandt value of greater than about 19.

According to at least one embodiment, the polar solvent is selected from the group consisting of acetone, carbon disulfide, pyridine, dimethyl sulfoxide, n-propanol, ethanol, n-butanol, propylene glycol, ethylene glycol, dimethlyformamide, acetonitrile, methanol and combinations thereof.

According to at least one embodiment, the polar solvent is acetonitrile.

According to at least one embodiment, the polar solvent is methanol.

According to at least one embodiment, the solvent extraction is conducted at a temperature of between about 20° C. and about 60° C. and at a pressure of between about 1 and about 10 bars.

According to at least one embodiment, the method further includes supplying the extracted hydrocarbon stream to an adsorption column, wherein the adsorption column is charged with an adsorbent suitable for the removal of oxidized compounds present in the extracted hydrocarbon stream, the adsorption column producing a high purity hydrocarbon product stream and a second residue stream, the second residue stream including a portion of the oxidized compounds.

According to at least one embodiment, the method further includes supplying the second residue stream to the fluid catalytic cracking unit.

According to at least one embodiment, the adsorbent is selected from the group consisting of activated carbon, silica gel, alumina, natural clays, silica-alumina, zeolites, and combinations of the same.

According to at least one embodiment, the adsorbent is a polymer coated support, wherein the support has a high surface area and is selected from the group consisting of silica gel, alumina, silica-alumina, zeolites, and activated carbon, and the polymer is selected from the group consisting of polysulfone, polyacrylonitrile, polystyrene, polyester terephthalate, polyurethane, and combinations of the same.

According to at least one embodiment, the supplying the first residue stream to the fluid catalytic cracking unit further includes contacting the first residue stream with a fluid catalytic cracking feedstream in the presence of a catalyst to catalytically crack the fluid catalytic cracking feedstream to recover hydrocarbons from the first residue stream.

According to at least one embodiment, the fluid catalytic cracking feedstream includes vacuum gas oil (VGO), reduced crude, demetalized oil, whole crude, cracked shale oil, liquefied coal, cracked bitumen, heavy coker gas oils, light cycle oils, heavy cycle oils, clarified slurry oils, or combinations thereof.

According to another embodiment, there is provided a method of recovering components from a hydrocarbon feedstock, in which the method includes supplying the hydrocarbon feedstock to an oxidation reactor, wherein the hydrocarbon feedstock includes sulfur compounds and nitrogen compounds, and contacting the hydrocarbon feedstock with an oxidizing agent in the oxidation reactor under conditions sufficient to selectively oxidize sulfur compounds and nitrogen compounds present in the hydrocarbon feedstock to produce an oxidized hydrocarbon stream that includes hydrocarbons, oxidized sulfur compounds, and oxidized nitrogen compounds. The method further includes separating the hydrocarbons, the oxidized sulfur compounds, and the oxidized nitrogen compounds in the oxidized hydrocarbon stream by solvent extraction with a polar solvent to produce an extracted hydrocarbon stream and a mixed stream, wherein the mixed stream includes the polar solvent, the oxidized sulfur compounds, and the oxidized nitrogen compounds, and wherein the extracted hydrocarbon stream has a lower concentration of sulfur compounds and nitrogen compounds than the hydrocarbon feedstock. The method further includes separating the mixed stream using a distillation column into a first recovered polar solvent stream and a first residue stream, wherein the first residue stream includes the oxidized sulfur compounds and the oxidized nitrogen compounds, supplying the first residue stream to a fluid catalytic cracking unit, and wherein the fluid catalytic cracking unit is operative to catalytically crack the oxidized sulfur and the oxidized nitrogen to produce regenerated catalyst and gaseous and liquid products and allow for recovery of hydrocarbons from the first residue stream. Further, the method includes contacting the first residue stream with a fluid catalytic cracking feedstream in the presence of a catalyst to catalytically crack the fluid catalytic cracking feedstream to recover hydrocarbons from the first residue stream, and supplying the first residue stream contacted with the fluid catalytic cracking feedstream through a hydrotreater prior to supplying the first residue stream to the fluid catalytic cracking unit.

According to at least one embodiment, the method further includes recycling at least a portion of the liquid products to the oxidation reactor to selectively oxidize sulfur compounds in the liquid products, the portion of the liquid products comprising at least one of light cycle oils and heavy cycle oils.

According to at least one embodiment, the method further includes supplying the extracted hydrocarbon stream to a stripper to produce a second recovered polar solvent stream and a stripped hydrocarbon stream, and recycling the first recovered polar solvent stream and the second polar solvent stream to an extraction vessel for the separating the hydrocarbons, wherein the oxidized sulfur compounds, and the oxidized nitrogen compounds in the oxidized hydrocarbon stream.

According to at least one embodiment, the method further includes recycling a portion of the regenerated catalyst with the fluid catalytic cracking feedstream to the fluid catalytic cracking unit, wherein the recycling further includes catalytically cracking the fluid catalytic cracking feedstream with the portion of the regenerated catalyst to recover the hydrocarbons from the first residue stream.

According to at least one embodiment, the oxidant is selected from the group consisting of air, oxygen, peroxides, hydroperoxides, ozone, nitrogen oxides compounds, and combinations thereof.

According to at least one embodiment, the contacting the hydrocarbon feedstock with an oxidizing agent occurs in the presence of a catalyst including a metal oxide having the formula $M_xO_y$, wherein M is an element selected from Groups IVB, VB, and VIB of the periodic table.

According to at least one embodiment, the sulfur compounds include sulfides, disulfides, mercaptans, thiophene, benzothiophene, dibenzothiophene, alkyl derivatives of dibenzothiophene, or combinations thereof.

According to at least one embodiment, the oxidation reactor is maintained at a temperature of between about 20 and about 350° C. and at a pressure of between about 1 and about 10 bars.

According to at least one embodiment, the ratio of the oxidant to sulfur compounds present in the hydrocarbon feedstock is between about 4:1 and about 10:1.

According to at least one embodiment, the polar solvent has a Hildebrandt value of greater than about 19.

According to at least one embodiment, the polar solvent is selected from the group consisting of acetone, carbon disulfide, pyridine, dimethyl sulfoxide, n-propanol, ethanol, n-butanol, propylene glycol, ethylene glycol, dimethlyformamide, acetonitrile, methanol and combinations thereof.

According to at least one embodiment, the polar solvent is acetonitrile.

According to at least one embodiment, the polar solvent is methanol.

According to at least one embodiment, the solvent extraction is conducted at a temperature of between about 20° C. and about 60° C. and at a pressure of between about 1 bar and about 10 bars.

According to at least one embodiment, the method further includes supplying the extracted hydrocarbon stream to an adsorption column, wherein the adsorption column is charged with an adsorbent suitable for the removal of oxidized compounds present in the extracted hydrocarbon stream, the absorption column producing a high purity hydrocarbon product stream and a second residue stream, the second residue stream including a portion of the oxidized compounds.

According to at least one embodiment, the method further includes supplying the second residue stream to the fluid catalytic cracking unit.

According to at least one embodiment, the adsorbent is selected from the group consisting of activated carbon, silica gel, alumina, natural clays, silica-alumina, zeolites, and combinations of the same.

According to at least one embodiment, the adsorbent is a polymer coated support, wherein the support has a high surface area and is selected from the group consisting of silica gel, alumina, and activated carbon, and the polymer is selected from the group consisting of polysulfone, polyacrylonitrile, polystyrene, polyester terephthalate, polyurethane, silica-alumina, zeolites, and combinations of the same.

According to at least one embodiment, the first residue stream and the fluid catalytic cracking feedstream are present in a weight ratio of the catalyst to the first residue stream and the fluid catalytic cracking feedstream ranges from about 1 to about 15.

According to at least one embodiment, the fluid catalytic cracking feedstream includes VGO, reduced crude, demetalized oil, whole crude, cracked shale oil, liquefied coal, cracked bitumen, heavy coker gas oils, light cycle oils, heavy cycle oils, clarified slurry oils, or combinations thereof.

According to at least one embodiment, the contacting the first residue stream with a fluid catalytic cracking feedstream in the presence of a catalyst occurs in a temperature range of about 300° C. to about 650° C.

According to at least one embodiment, the contacting the first residue stream with a fluid catalytic cracking feedstream in the presence of a catalyst occurs in a residence time of about 0.1 second to about 10 minutes.

According to at least one embodiment, the method further includes separating lower boiling components and catalyst particles from the first residue stream and the fluid catalytic cracking feedstream, and regenerating at least a portion of the catalyst particles.

According to at least one embodiment, the regenerating the at least a portion of the catalyst particles includes contacting the portion of the catalyst particles with a water-free oxygen-containing gas in a fluidized bed operated at conditions to produce regenerated catalyst and gaseous and liquid products including carbon monoxide and carbon dioxide.

BRIEF DESCRIPTION OF THE DRAWINGS

So that the manner in which the features and advantages of the method and system disclosed, as well as others which will become apparent, may be understood in more detail, a more particular description of the method and system briefly summarized previously may be had by reference to the embodiments thereof which are illustrated in the appended drawings, which form a part of this specification. It is to be noted, however, that the drawings illustrate only various embodiments and are therefore not to be considered limiting of the scope as it may include other effective embodiments as well. Like numbers refer to like elements throughout, and the prime notation, if used, indicates similar elements in alternative embodiments or positions.

DETAILED DESCRIPTION

Although the following detailed description contains many specific details for purposes of illustration, it is understood that one of ordinary skill in the art will appreciate that many examples, variations and alterations to the following details are within the scope and spirit. Accordingly, the various embodiments described and provided in the appended figures are set forth without any loss of generality, and without imposing limitations, relating to the claims.

Embodiments address known problems associated with conventional methods of upgrading and recovering compounds from a hydrocarbon feedstock, particularly the desulfurization, denitrogenation, or both, of hydrocarbon feedstocks, and the subsequent removal and recovery of usable hydrocarbons. According to at least one embodiment, there is provided a method for the removal of sulfur and nitrogen compounds from a hydrocarbon feedstock and the use of oxidized sulfur species and oxidized nitrogen species in a FCC process.

As used, the terms "upgrading" or "upgraded," with respect to petroleum or hydrocarbons refers to a petroleum or hydrocarbon product that is lighter (that is, has fewer carbon atoms, such as methane, ethane, and propane), has at least one of a higher API gravity, higher middle distillate yield, lower sulfur content, lower nitrogen content, or lower metal content, than does the original petroleum or hydrocarbon feedstock.

Figure 1:
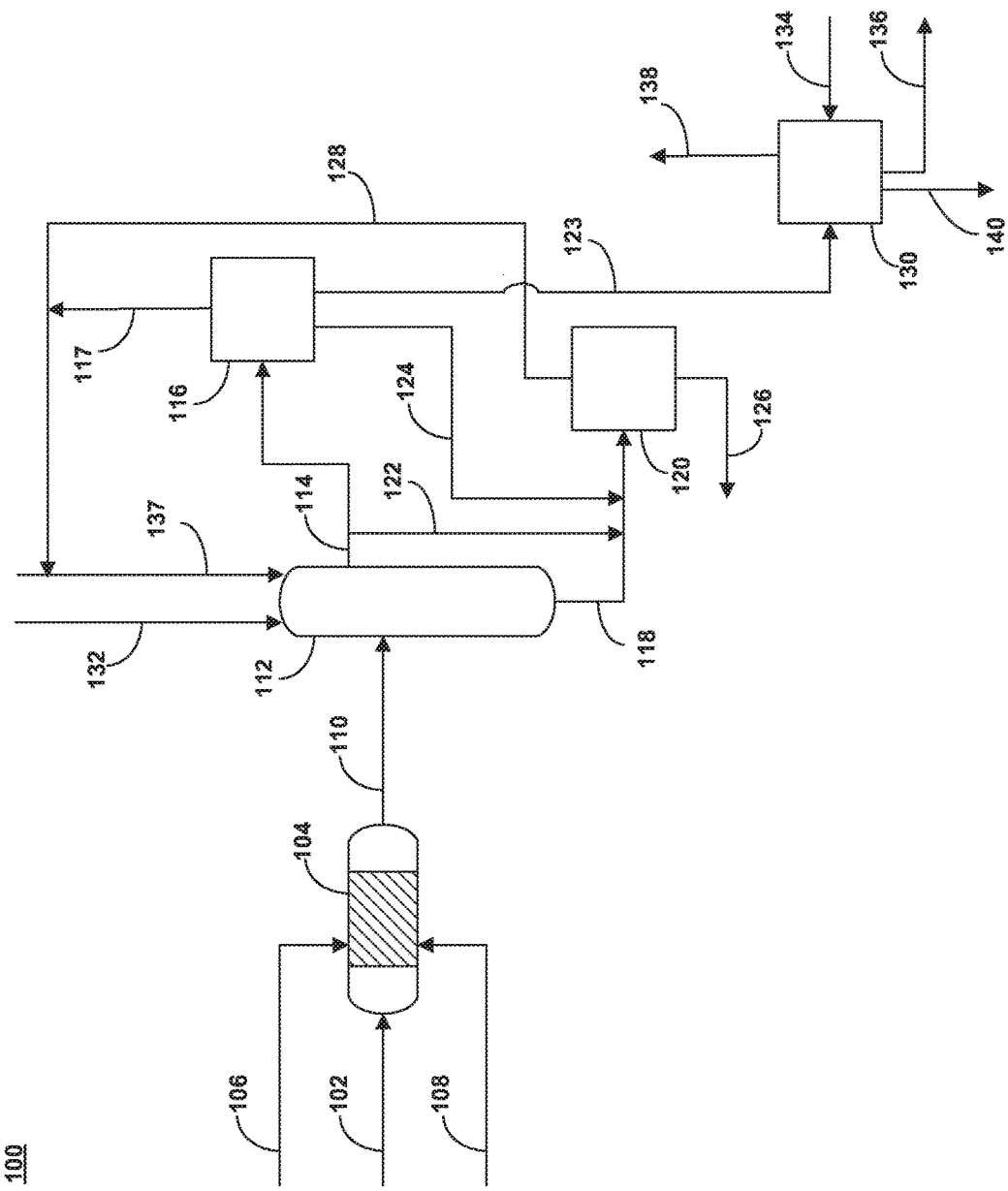
FIG. 1 provides a schematic diagram of one embodiment of the method of upgrading a hydrocarbon feedstock.

FIG. 1 provides one embodiment for the recovery of hydrocarbons. Hydrocarbon recovery system 100 includes oxidation reactor 104, extraction vessel 112, solvent regeneration column 116, stripper 120, and FCC unit 130.

According to at least one embodiment, there is provided a method for the recovery of components from a hydrocarbon feedstock, particularly a hydrocarbon feedstock that includes sulfur- and nitrogen-containing compounds. The method includes supplying hydrocarbon feedstock 102 to oxidation reactor 104, where the hydrocarbon feedstock is contacted with an oxidant and a catalyst. The oxidant can be supplied to oxidation reactor 104 via oxidant feed line 106 and fresh catalyst can be supplied to the reactor via catalyst feed line 108.

According to at least one embodiment, hydrocarbon feedstock 102 can be any petroleum based hydrocarbon, and can include various impurities, such as elemental sulfur, compounds that include sulfur or nitrogen, or both. In certain embodiments, hydrocarbon feedstock 102 can be a diesel oil having a boiling point between about 150° C. and about 400° C. Alternatively, hydrocarbon feedstock 102 can have a boiling point up to about 450° C., alternatively up to about 500° C. Alternatively, hydrocarbon feedstock 102 can have a boiling point between about 100° C. and about 500° C. Optionally, hydrocarbon feedstock 102 can have a boiling point up to about 600° C., alternatively up to about 700° C., or, in certain embodiments, greater than about 700° C. According to at least one embodiment, the feedstock exists in a solid state after distillation called residue. In certain embodiments, hydrocarbon feedstock 102 can include heavy hydrocarbons. As used, heavy hydrocarbons refer to hydrocarbons having a boiling point of greater than about 360° C., and can include aromatic hydrocarbons, as well as alkanes and alkenes. Generally, in certain embodiments, hydrocarbon feedstock 102 can be selected from whole range crude oil, topped crude oil, product streams from oil refineries, product streams from refinery steam cracking processes, liquefied coals, liquid products recovered from oil or tar sand, bitumen, oil shale, asphaltene, hydrocarbon fractions such as diesel and VGO boiling in the range of about 180 to about 370° C. and about 370 to about 520° C., respectively, and the like, and mixtures thereof.

Sulfur compounds present in hydrocarbon feedstock 102 can include sulfides, disulfides, and mercaptans, as well as aromatic molecules such as thiophenes, benzothiophenes, dibenzothiophenes, and alkyl dibenzothiophenes, such as 4,6-dimethyl-dibenzothiophene. Aromatic compounds are typically more abundant in higher boiling fractions, than is typically found in the lower boiling fractions.

Nitrogen-containing compounds present in hydrocarbon feedstock 102 can include compounds having the following structures:

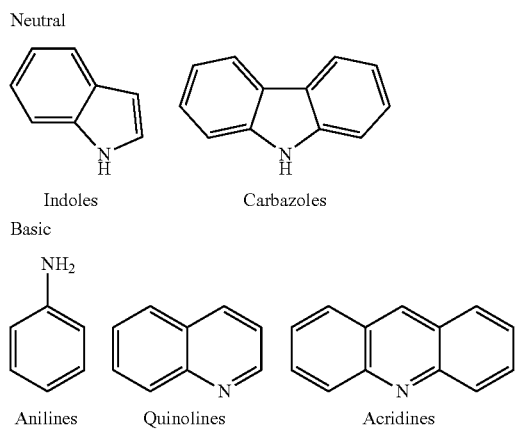

Please note that the sulfur oxidation is the limiting targeted reaction, during which nitrogen oxidation occurs. Two types could be considered basic and neutral nitrogen.

According to at least one embodiment, oxidation reactor 104 can be operated at mild conditions. More specifically, in certain embodiments, oxidation reactor 104 can be maintained at a temperature of between about 30° C. and about 350° C., or alternatively, between about 45° C. and about 60° C. The operating pressure of oxidation reactor 104 can be between about 1 bar and about 30 bars, alternatively between about 1 bar and about 15 bars, alternatively between about 1 bar and about 10 bars, or alternatively between about 2 bars and about 3 bars. The residence time of the hydrocarbon feedstock within oxidation rector 104 can be between about 1 minutes and about 120 minutes, alternatively between about 15 minutes and about 90 minutes, alternatively between about 5 minutes and about 90 minutes, alternatively between about 5 minutes and about 30 minutes, alternatively between about 30 minutes and about 60 minutes, and is preferably for a sufficient amount of time for the oxidation of any sulfur or nitrogen compounds present in the hydrocarbon feedstock. According to at least one embodiment, the residence time of the hydrocarbon feedstock within oxidation rector 104 is between about 15 minutes and about 90 minutes.

According to at least one embodiment, oxidation reactor 104 can be any reactor suitably configured to ensure sufficient contacting between hydrocarbon feedstock 102 and the oxidant, in the presence of a catalyst, for the oxidation of the sulfur- and nitrogen-containing compounds. Sulfur and nitrogen compounds present in hydrocarbon feedstock 102 are oxidized in oxidation reactor 104 to sulfones, sulfoxides, and oxidized nitrogen compounds, which can be subsequently removed by extraction or adsorption. Various types of reactors can be used. For example, the reactor can be a batch reactor, a fixed bed reactor, an ebullated bed reactor, lifted reactor, a fluidized bed reactor, a slurry bed reactor, or combinations thereof. Other types of suitable reactors that can be used will be apparent to those of skill in the art and are to be considered within the scope of various embodiments. Examples of suitable oxidized nitrogen compounds can include pyridine-based compounds and pyrrole-based compounds. It is believed that the nitrogen atom is not directly oxidized, rather it is the carbon atom(s) next to the nitrogen that is actually oxidized. A few examples of oxidized nitrogen compounds can include the following compounds:

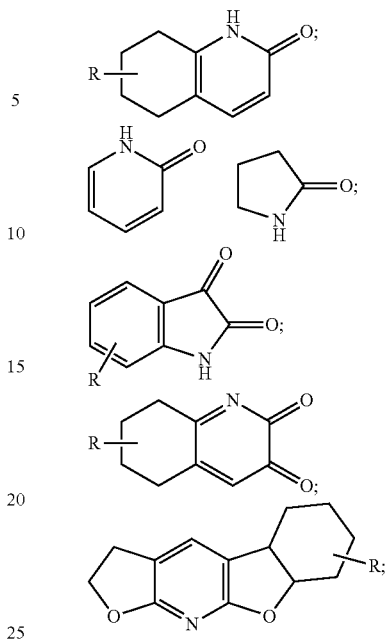

or combinations thereof.

According to at least one embodiment, the oxidant is supplied to oxidation reactor 104 via oxidant feed stream 106. Suitable oxidants can include air, oxygen, hydrogen peroxide, organic peroxides, hydroperoxides, organic peracids, peroxo acids, oxides of nitrogen, ozone, and the like, and combinations thereof. Peroxides can be selected from hydrogen peroxide and the like. Hydroperoxides can be selected from t-butyl hydroperoxide and the like. Organic peracids can be selected from peracetic acid and the like.

According to at least one embodiment, the mole ratio of oxidant to sulfur present in the hydrocarbon feedstock can be from about 1:1 to about 50:1, preferably between about 2:1 and about 20:1, more preferably between about 4:1 and about 10:1. According to at least one embodiment, the molar feed ratio of oxidant to sulfur can range from about 1:1 to about 30:1.

According to at least one embodiment, the molar feed ratio of oxidant to nitrogen compounds can be from about 4:1 to about 10:1. According to at least one embodiment, the feedstock can contain more nitrogen compounds than sulfur, such as, for instance, South American Crude oils, Africa crude oils, Russian crude oils, China crude oils, or intermediate refinery streams, such as coker, thermal cracking, visbreaking, gas oils, FCC cycle oils, and the like.

According to at least one embodiment, the catalyst can be supplied to oxidation reactor 104 via catalyst feed stream 108. The catalyst can be a homogeneous catalyst. The catalyst can include at least one metal oxide having the chemical formula $M_xO_y$, where M is a metal selected from groups IVB, VB, or VIB of the periodic table. Metals can include titanium, vanadium, chromium, molybdenum, and tungsten. Molybdenum and tungsten are two particularly effective catalysts that can be used in various embodiments. In certain embodiments, the spent catalyst can be rejected from the system with the aqueous phase (for example, when using an aqueous oxidant) after the oxidation vessel.

According to at least one embodiment, the ratio of catalyst to oil is between about 0.1 wt % and about 10 wt %, preferably between about 0.5 wt % and about 5 wt %. In certain embodiments, the ratio is between about 0.5 wt % and about 2.5 wt %. Alternatively, the ratio is between about 2.5 wt % and about 5 wt %. Other suitable weight ratios of catalyst to oil will be apparent to those of skill in the art and are to be considered within the scope of the various embodiments.

Catalyst present in oxidation reactor 104 can increase the rate of oxidation of the various sulfur- and nitrogen-containing compounds in hydrocarbon feedstock 102, reduce the amount of oxidant necessary for the oxidation reaction, or both. In certain embodiments, the catalyst can be selective toward the oxidation of sulfur species. In other embodiments, the catalyst can be selective toward the oxidation of nitrogen species.

Oxidation reactor 104 produces oxidized hydrocarbon stream 110, which can include hydrocarbons and oxidized sulfur- and oxidized nitrogen-containing species. Oxidized hydrocarbon stream 110 is supplied to extraction vessel 112 where the oxidized hydrocarbon stream and oxidized sulfur- and oxidized nitrogen-containing species are contacted with extraction solvent stream 137. Extraction solvent 137 can be a polar solvent, and in certain embodiments, can have a Hildebrandt solubility value of greater than about 19. In certain embodiments, when selecting the particular polar solvent for use in extracting oxidized sulfur- and oxidized nitrogen-containing species, selection can be based upon, in part, solvent density, boiling point, freezing point, viscosity, and surface tension, as non-limiting examples. Polar solvents suitable for use in the extraction step can include acetone (Hildebrand value of 19.7), carbon disulfide (20.5), pyridine (21.7), dimethyl sulfoxide (DMSO) (26.4), n-propanol (24.9), ethanol (26.2), n-butyl alcohol (28.7), propylene glycol (30.7), ethylene glycol (34.9), dimethylformamide (DMF) (24.7), acetonitrile (30), methanol (29.7), and like compositions or compositions having similar physical and chemical properties. In certain embodiments, acetonitrile and methanol, due to their low cost, volatility, and polarity, are preferred. Methanol is a particularly suitable solvent for use in embodiments. In certain embodiments, solvents that include sulfur, nitrogen, or phosphorous, preferably have a relatively high volatility to ensure adequate stripping of the solvent from the hydrocarbon feedstock.

According to at least one embodiment, the extraction solvent is non-acidic. The use of acids is typically avoided due to the corrosive nature of acids, and the requirement that all equipment be specifically designed for a corrosive environment. In addition, acids, such as acetic acid, can present difficulties in separation due to the formation of emulsions.

According to at least one embodiment, extraction vessel 112 can be operated at a temperature of between about 20° C. and about 60° C., preferably between about 25° C. and about 45° C., even more preferably between about 25° C. and about 35° C. Extraction vessel 112 can operate at a pressure of between about 1 and about 10 bars, preferably between about 1 and about 5 bars, more preferably between about 1 and about 2 bars. In certain embodiments, extraction vessel 112 operates at a pressure of between about 2 and about 6 bars.

According to at least one embodiment, the ratio of the extraction solvent to hydrocarbon feedstock can be between about 1:3 and about 3:1, preferably between about 1:2 and about 2:1, more preferably about 1:1. Contact time between the extraction solvent and oxidized hydrocarbon stream 110 can be between about 1 second and about 60 minutes, preferably between about 1 second and about 10 minutes. In certain preferred embodiments, the contact time between the extraction solvent and oxidized hydrocarbon stream 110 is less than about 15 minutes. In certain embodiments, extraction vessel 112 can include various means for increasing the contact time between the extraction solvent and oxidized sulfur- and oxidized nitrogen-containing hydrocarbon stream 110, or for increasing the degree of mixing of the two solvents. Means for mixing can include mechanical stirrers or agitators, trays, or like means.

According to at least one embodiment, extraction vessel 112 produces mixed stream 114 that can include extraction solvent, oxidized species (for example, the oxidized sulfur and nitrogen species that were originally present in hydrocarbon feedstock 102), and traces of hydrocarbon feedstock 102, and extracted hydrocarbon stream 118, which can include the hydrocarbon feedstock having a reduced sulfur and low nitrogen content, relative to hydrocarbon feedstock 102.

Mixed stream 114 is supplied to solvent regeneration column 116 where extraction solvent can be recovered as first recovered solvent stream 117 and separated from first residue stream 123, which includes oxidized sulfur and oxidized nitrogen compounds. Optionally, mixed stream 114 can be separated in solvent regeneration column 116 into a recovered hydrocarbon stream 124, which can include hydrocarbons present in mixed stream 114 from hydrocarbon feedstock 102. Solvent regeneration column 116 can be a distillation column that is configured to separate mixed stream 114 into first recovered solvent stream 117, first residue stream 123, and recovered hydrocarbon stream 124.

Extracted hydrocarbon stream 118 can be supplied to stripper 120, which can be a distillation column or like vessel designed to separate a hydrocarbon product stream from residual extraction solvent. In certain embodiments, a portion of mixed stream 114 can be supplied to stripper 120 via line 122, and may optionally be combined with extracted hydrocarbon stream 118. In certain embodiments, solvent regeneration column 116 can produce recovered hydrocarbon stream 124, which can be supplied to stripper 120, where recovered hydrocarbon stream 124 can optionally be contacted with extracted hydrocarbon stream 118 or a portion of mixed stream 114, which can be supplied to stripper 120 via line 122.

Stripper 120 separates the various streams supplied thereto into stripped oil stream 126, which has a reduced sulfur and nitrogen content relative to hydrocarbon feedstock 102, and second recovered solvent stream 128.

In certain embodiments, first recovered solvent stream 117 can be combined with second recovered solvent stream 128 and recycled to extraction vessel 112. Optionally, make-up solvent stream 132, which can include fresh solvent, can be combined with first recovered solvent stream 117, second recovered solvent stream 128, or both, and supplied to extraction vessel 112.

First residue stream 123, which includes oxidized compounds, such as oxidized sulfur and nitrogen compounds, and which can also include low concentrations of hydrocarbonaceous material, can be supplied to FCC unit 130 where liquid products (including hydrocarbons) 136 are recovered. According to at least one embodiment, oxidized sulfur compounds, such as sulfones, and oxidized nitrogen compounds are embedded in heavy hydrocarbons, such as hydrocarbons having a boiling point in a range of about 343° C. to about 524° C.; or alternatively, in a range of about 360° C. to about 550° C.

According to various embodiments in which first residue stream 123 is sent to FCC unit 130, first residue stream 123 is contacted with FCC feedstream 134 in the presence of a catalyst to catalytically crack FCC feedstream 134 to recover liquid products 136 from first residue stream 123. According to at least one embodiment, the catalyst can include hot solid zeolitic active catalyst particles. According to at least one embodiment, the weight ratio of catalyst to FCC feedstream 134 is within a range of between about 1 and about 15 with a pressure ranging from about 1 barg (gauge pressure) to about 200 barg to form a suspension. Other suitable ratios of catalyst and FCC feedstream 134 and operating conditions will be apparent to those of skill in the art and are to be considered within the scope of the various embodiments.

According to at least one embodiment, the suspension is then passed through a riser reaction zone or downer at a temperature (not shown) between about 300° C. and less than about 650° C. to catalytically crack the FCC feedstream 134, while avoiding thermal conversion of said feedstream 134 and providing a hydrocarbon residence time between about 0.1 second and about 10 minutes.

According to at least one embodiment, the lower boiling components and the solid catalyst particles are then separated and recovered. At least a portion of the separated solid catalyst particles is regenerated with a water-free oxygen-containing gas in a fluidized bed operated at conditions to produce regenerated catalyst 140 and gaseous products 138 consisting essentially of carbon monoxide and carbon dioxide and liquid products 136. At least a portion of the regenerated catalyst is returned and combined with FCC feedstream 134 (not shown).

According to at least one embodiment, the types of components contained in FCC feedstream 134 can vary. FCC feedstream 134 can include VGO, reduced crude, demetalized oil, whole crude, cracked shale oil, liquefied coal, cracked bitumens, heavy coker gas oils, and FCC heavy products, such as LCO, HCO and CSO, as non-limiting examples. Table 1 shows the typical yield from a FCC unit. As another example, FCC feedstream 134 sent to the FCC unit 130 can have the properties shown in Table 2. Other suitable compounds that can be used in FCC feedstream 134 being sent to the FCC unit 130 will be apparent to those of skill in the art and are to be considered within the scope of the various embodiments.

TABLE 1

| Products | Yields Wt % |
|---|---|
| Fuel gas | 4.5 |
| Liquefied Petroleum Gas (LPG) | 12.2 |
| Light Gasoline | 36.4 |
| Heavy Gasoline | 11.5 |
| Light Cycle Oil (LCO) | 9.8 |
| Clarified Slurry Oil (CSO) | 21.3 |
| Coke | 4.3 |
| TOTAL | 100.0 |

TABLE 2

| API | 23.7 |
|---|---|
| Sulfur (wt %) | 2.40 |
| Distillation Range | |
| Initial boiling point (IBP) | 507° C. |
| 10% | 669° C. |
| 30% | 754° C. |
| 50% | 819° C. |
| 70% | 874° C. |
| 90% | 941° C. |
| Final Boiling Point (FBP) | 970° C. |

Various types of catalysts can be used in FCC unit 130. According to at least one embodiment, FCC catalyst particles include a zeolitic matrix with metals selected from Groups IVB, VI, VII, VIIIB, IB, IIB, or a compound thereof, and with catalyst particles less than 200 microns in nominal diameter. Other suitable types of catalysts that can be used in FCC unit 130 will be apparent to those of skill in the art and are to be considered within the scope of the various embodiments.

According to at least one embodiment, the operating parameters for FCC unit 130 can be varied depending upon the type of FCC feedstream 134 that is sent to FCC unit 130. FCC unit 130 is conducted in the temperature range of about 400° C. to about 850° C. According to another embodiment, FCC unit 130 can be operated at a pressure ranging from about 1 barg to about 200 barg. According to another embodiment, FCC unit 130 can be operated for a residence time ranging from about 0.1 second to about 3600 seconds. Other suitable operating parameters for FCC unit 130 will be apparent to those of skill in the art and are to be considered within the scope of the various embodiments. The properties of the components recovered from FCC unit 130 will vary depending upon the composition of the hydrocarbon FCC feedstream 134.

Figure 2:
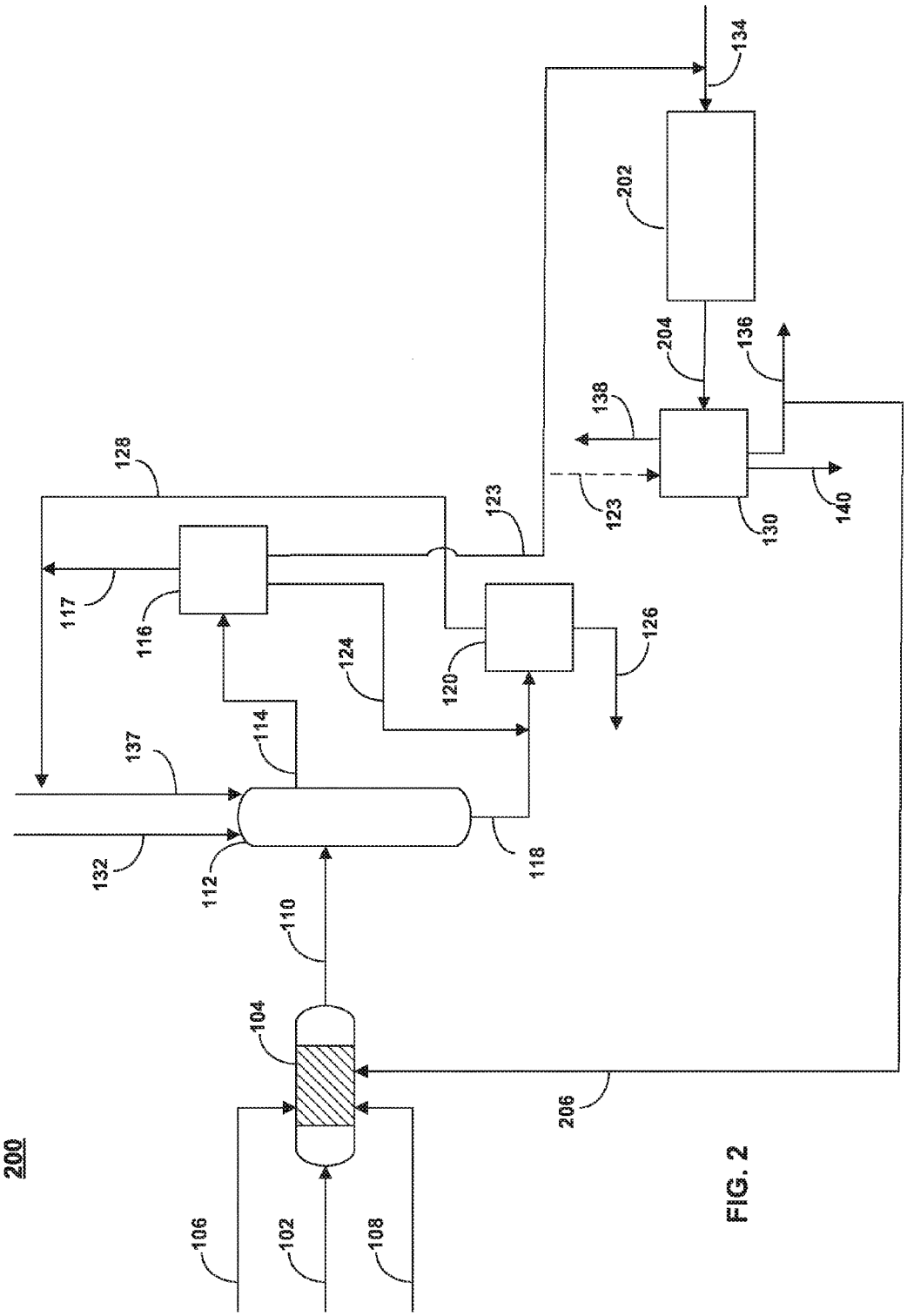
FIG. 2 provides a schematic diagram of one embodiment of the method of upgrading a hydrocarbon feedstock.

FIG. 2 provides one embodiment for the recovery of hydrocarbons from a feedstream. Hydrocarbon recovery system 200 includes oxidation reactor 104, extraction vessel 112, solvent regeneration column 116, stripper 120, FCC unit 130, and hydrotreater 202.

As discussed previously with respect to embodiments shown in FIG. 1, first residue stream 123, which includes oxidized compounds, such as oxidized sulfur and nitrogen compounds, and which can also include low concentrations of hydrocarbonaceous material, can be supplied to FCC unit 130 where liquid products (including hydrocarbons) 136 are recovered. According to at least one embodiment, oxidized sulfur compounds, such as sulfones, and oxidized nitrogen compounds are embedded in heavy hydrocarbons, such as hydrocarbons having a boiling point in a range of about 343° C. to about 524° C.; or alternatively, in a range of about 360° C. to about 550° C.

According to various embodiments, as shown in FIG. 2, first residue stream 123 is contacted with FCC feedstream 134 and subsequently fed through hydrotreater 202 to hydrotreat the mixture for reducing sulfur, nitrogen, and aromatics. Resultant stream 204 exits hydrotreater 202 and is fed to FCC unit 130 in the presence of a catalyst to catalytically crack resultant stream 204 to recover liquid products 136 from first residue stream 123 and resultant stream 204. According to at least one embodiment, the catalyst can include hot solid zeolitic active catalyst particles. According to at least one embodiment, the weight ratio of catalyst to resultant stream 204 is within a range of between about 1 and about 15 with a pressure ranging from about 1 barg to about 200 barg to form a suspension. Other suitable ratios of catalyst and resultant stream 204 and operating conditions will be apparent to those of skill in the art and are to be considered within the scope of the various embodiments.

Optionally, first residue stream 123 is sent directly to FCC unit 130 where it is contacted with FCC feedstream 134 in the presence of the catalyst to catalytically crack the FCC feedstream 134 to recover liquid products 136 from first residue stream 123.

According to at least one embodiment, the suspension is then passed through a riser reaction zone or downer at a temperature (not shown) between about 300° C. and less than about 650° C. to catalytically crack the FCC feedstream 134, while avoiding thermal conversion of said feedstream 134 and providing a hydrocarbon residence time between about 0.1 second and about 10 minutes.

According to at least one embodiment, the lower boiling components and the solid catalyst particles are then separated and recovered. At least a portion of the separated solid catalyst particles is regenerated with a water-free oxygen-containing gas in a fluidized bed operated at conditions to produce regenerated catalyst 140 and gaseous products 138 consisting essentially of carbon monoxide and carbon dioxide and liquid products 136. At least a portion of the regenerated catalyst is returned and combined with FCC feedstream 134 (not shown).

As further shown in FIG. 2, in certain embodiments, at least a portion of liquid products 136 is recycled via line 206 back to oxidation reactor 104, where liquid products 136 contains at least one of light cycle oils and heavy cycle oils. Liquid products 136 are sulfur rich and can be desulfurized in the oxidative desulfurized process occurring in oxidation reactor 104.

Various types of catalysts can be used in FCC unit 130. According to at least one embodiment, FCC catalyst particles include a zeolitic matrix with metals selected from Groups IVB, VI, VII, VIIIB, IB, IIB, or a compound thereof, and with catalyst particles less than 200 microns in nominal diameter. Other suitable types of catalysts that can be used in FCC unit 130 will be apparent to those of skill in the art and are to be considered within the scope of the various embodiments.

Figure 3:
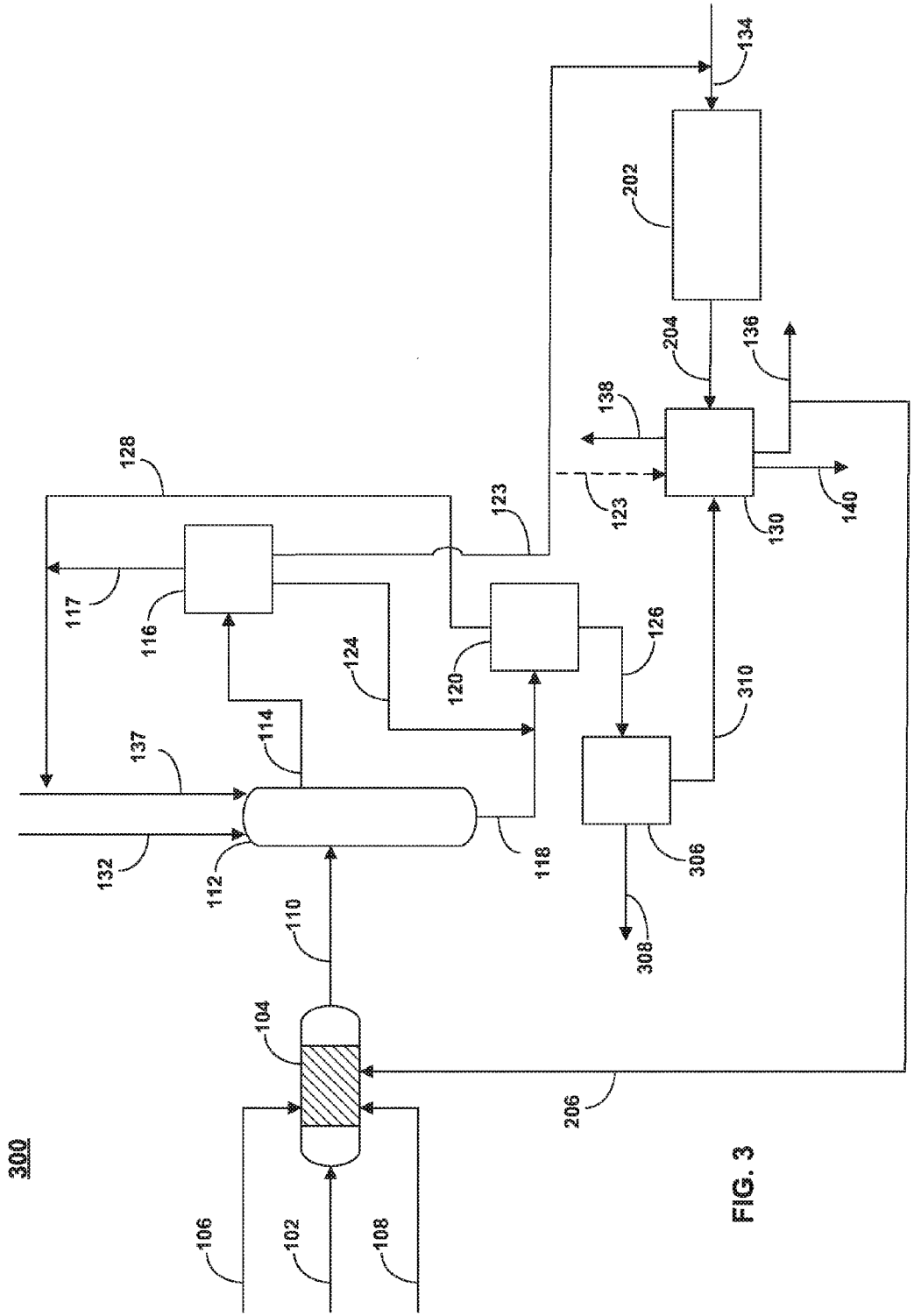
FIG. 3 provides a schematic diagram of one embodiment of the method of upgrading a hydrocarbon feedstock.

FIG. 3 provides one embodiment for the recovery of hydrocarbons from a feedstream. Hydrocarbon recovery system 300 includes oxidation reactor 104, extraction vessel 112, solvent regeneration column 116, stripper 120, FCC unit 130, hydrotreater 302, and adsorption column 306.

As shown in FIG. 3, in certain embodiments, stripped oil stream 126 can be supplied to adsorption column 306, where stripped oil stream 126 can be contacted with one or more adsorbents designed to remove one or more various impurities, such as sulfur-containing compounds, oxidized sulfur compounds, nitrogen-containing compounds, oxidized nitrogen compounds, and metals remaining in the hydrocarbon product stream after oxidation and solvent extraction steps.

According to various embodiments, the one or more adsorbents can include activated carbon; silica gel; alumina; natural clays; silica-alumina; zeolites; and fresh, used, regenerated or rejuvenated catalysts having affinity to remove oxidized sulfur and nitrogen compounds and other inorganic adsorbents. In certain embodiments, the adsorbent can include polar polymers that have been applied to or that coat various high surface area support materials, such as silica gel, alumina, and activated carbon. Example polar polymers for use in coating various support materials can include polysulfones, polyacrylonitrile, polystyrene, polyester terephthalate, polyurethane, other like polymer species that exhibit an affinity for oxidized sulfur species, and combinations thereof.

According to at least one embodiment, adsorption column 306 can be operated at a temperature of between about 20° C. and about 60° C., preferably between about 25° C. and about 40° C., even more preferably between about 25° C. and about 35° C. In certain embodiments, the adsorption column can be operated at a temperature of between about 10° C. and about 40° C. In certain embodiments, the adsorption column can be operated at temperatures of greater than about 20° C., or alternatively at temperatures less than about 60° C. Adsorption column 306 can be operated at a pressure of up to about 15 bars, preferably up to about 10 bars, even more preferably between about 1 and about 2 bars. In certain embodiments, adsorption column 306 can be operated at a pressure of between about 2 and about 5 bar. In accordance with at least one embodiment, the adsorption column can be operated at a temperature of between about 25° C. and about 35° C. and a pressure of between about 1 and about 2 bars. The weight ratio of the stripped oil stream to the adsorbent is between about 1:1 to about 20:1; or alternatively, about 10:1.

Adsorption column 306 separates the feed into extracted hydrocarbon product stream 308 having very low sulfur content (for example, less than 15 ppmw of sulfur) and very low nitrogen content (for example, less than 10 ppmw of nitrogen), and second residue stream 310. Second residue stream 310 includes oxidized sulfur- and oxidized nitrogen-containing compounds, and as shown in FIG. 3 is directed to FCC unit 130. Optionally, stream 310 can be combined with first residue stream 123 and supplied to FCC unit 130 and processed as noted previously. As previously described for FIG. 2, first residue stream 123 is contacted with FCC feedstream 134 and subsequently fed through hydrotreater 202 to hydrotreat the mixture for reducing sulfur, nitrogen, and aromatics. Resultant stream 204 exits hydrotreater 202 and is fed to FCC unit 130 in the presence of a catalyst to catalytically crack resultant stream 204 to recover liquid products 136 from first residue stream 123 and resultant stream 204. Furthermore, optionally, first residue stream 123 is sent directly to FCC unit 130 where it is contacted with FCC feedstream 134 in the presence of the catalyst to catalytically crack the FCC feedstream 134 to recover liquid products 136 from first residue stream 123.

The adsorbent can be regenerated by contacting spent adsorbent with a polar solvent, such as methanol or acetonitrile, to desorb the adsorbed oxidized compounds from the adsorbent. In certain embodiments, heat, stripping gas, or both, can also be employed to facilitate the removal of the adsorbed compounds. Other suitable methods for removing the absorbed compounds will be apparent to those of skill in the art and are to be considered within the scope of the various embodiments.

EXAMPLES

Figure 4:
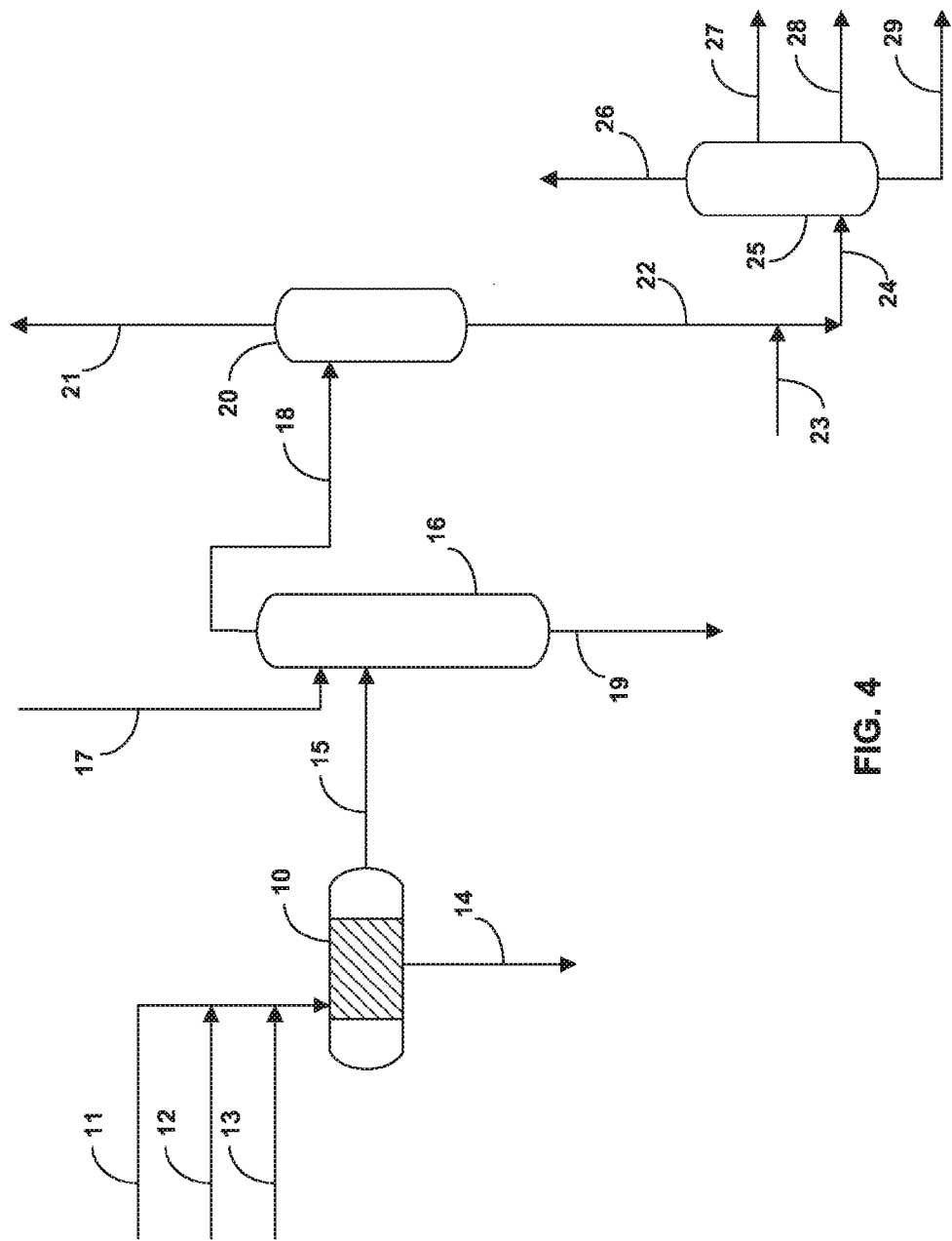
FIG. 4 provides a schematic diagram of the process described in the example.

FIG. 4 shows the process flow diagram for the oxidative desulfurization (oxidation and extraction steps) and FCC unit. Vessels 10, 16, 20 and 25 are oxidation, extraction, solvent recovery, and FCC vessels, respectively.

A hydrotreated straight run diesel containing 500 ppmw of elemental sulfur, 0.28 wt % of organic sulfur, density of 0.85 kilogram per liter (Kg/l) was oxidatively desulfurized. The reaction conditions were as follows:

Hydrogen peroxide:sulfur mol ratio: 4:1

Catalyst: Molybdenum based Mo(VI)

Reaction time: 30 minutes

Temperature: 80° C.

Pressure: 1 kilogram per centimeter squared (Kg/cm$^2$)

TABLE 3

Oxidation Step Material Balance

| Component | Stream # 11 Diesel Kg/h | Stream # 12 H₂O₂ Kg/h | Stream # 13 Catalyst Kg/h | Stream # 14 Catalyst Waste Kg/h |
|---|---|---|---|---|
| Water | 0 | 983 | 0 | 8,837 |
| Methanol | 0 | 0 | 0 | 0 |
| Diesel | 173,622 | 0 | 0 | 0 |
| Organic Sulfur | 788 | 0 | 0 | 2 |
| Acetic Acid | 0 | 0 | 10,747 | 10,747 |
| H₂O₂ | 0 | 295 | 0 | 0 |
| Na₂WO₄ (kg) | 0 | 0 | 4,841 | 4,793 |
| Total Kg/h | 174,410 | 1,278 | 15,588 | 24,739 |

TABLE 4

Extraction Step Material Balance

| Component\stream | 15 Oxidized Diesel Kg/h | 17 Methanol in Kg/h | 18 Methanol Sulfones out Kg/h | 19 Extracted Oil Kg/h | 21 Methanol Kg/h | 22 Sulfones Kg/h |
|---|---|---|---|---|---|---|
| Water | 0 | 0 | 0 | 0 | 0 | 0 |
| Methanol | 0 | 269,990 | 269,781 | 210 | 269,781 | 0 |
| Diesel | 173,622 | 0 | 0 | 173,622 | 173,622 | 0 |
| Organic Sulfur | 787 | 0 | 779 | 8 | 0 | 771 |
| Acetic Acid | 0 | 0 | 0 | 0 | 0 | 0 |
| Na₂WO₄ (kg) | 5 | 0 | 5 | 0 | 0 | 0 |
| Total Kgh | 174,414 | 269,990 | 270,565 | 173,840 | 443,403 | 771 |

According to at least one embodiment, the FCC unit was operated at 518° C. with a catalyst to oil ratio of 5, which resulted in 67 wt % conversion of the feedstock. In addition to the sulfones produced in the oxidative step, straight run VGO derived from Arabian crude oils was used as a blending component. The feedstock contained 2.65 wt % sulfur and 0.13 wt % of micro carbon residue. The mid and 95 wt % boiling points for the feedstocks were 408° C. and 455° C., respectively.

The FCC conversion of the feedstock was calculated, using Equation (1), as:

$$\text{Conversion} = \text{Dry Gas} + \text{LPG} + \text{Gasoline} + \text{Coke} \quad (1)$$

The catalyst used was an equilibrium catalyst and used as is without any treatment. The catalyst has 131 meter squared per gram (m²/g) surface area and 0.1878 centimeter squared per gram (cm³/g) pore volume. The nickel and vanadium contents are 96 and 407 ppmw, respectively. The FCC process yielded the following products and deposited coke on the catalysts.

| | |
|---|---|
| Dry gas | $H_2$, $CH_4$, $C_2H_6$, $C_2H_4$ |
| Wet gas | $C_3$, $C_4$ compounds (LPG) |
| Gasoline | Liquid product containing $C_5$ to $C_{12}$ hydrocarbons; typical end boiling point 221° C. |
| LCO | Light cycle oil containing $C_{12}$-$C_{20}$ hydrocarbons; typical boiling point 221-343° C. |
| HCO | Heavy cycle oil containing $C_{20+}$ hydrocarbons with a minimum boiling point of 343° C. |
| Coke | Solid carbonaceous deposit on the catalyst; typical C—H ratio = 1 |

The coke produced in the FCC process was 2.5 wt % of the feedstock processed. The product yields are given in Table 5:

TABLE 5

FCC Step Material Balance

| | 22 Sulfones Kg/h | 23 VGO Kg/h | 24 FCC Feedstock Kg/h | 26 Gases Kg/h | 27 Gasoline Kg/h | 28 LCO Kg/h | 29 HCO Kg/h |
|---|---|---|---|---|---|---|---|
| Stream Type | Feed | Feed | Feed | Oil | Oil | Oil | Oil |
| Phase | Oil | Oil | Oil | Oil | Oil | Oil | Oil |
| Sulfur, wt % | 0.05 | 2.67 | 2.5 | | 0.27 | 2.65 | 4.70 |
| VGO | | 10,000 | 10,000 | | | | |
| Total Gas | | | | 771 | | | |
| Sulfones | 771 | | | | 1,822 | | |

TABLE 5-continued

FCC Step Material Balance

| | Stream # | | | | | |
|---|---|---|---|---|---|---|
| 22 | 23 | 24 | 26 | 27 | 28 | 29 |
| | | | Stream Name | | | |
| Sulfones Kg/h | VGO Kg/h | FCC Feedstock Kg/h | Gases Kg/h | Gasoline Kg/h | LCO Kg/h | HCO Kg/h |
| Gasoline | | | | 4,957 | | |
| LCO | | | | | 1,707 | |
| HCO | | | | | | 1,764 |
| Total 771 | 10,000 | 10,771 | 1,822 | 4,957 | 1,707 | 1,764 |

According to one example, VGO was hydrodesulfurized over Co—Mo/Alumina catalyst to obtain a final product with 500 ppmw of sulfur. The conditions are summarized in Table 6:

TABLE 6

Operating Conditions for Hydrotreater

| Item | Units | Reactor |
|---|---|---|
| LHSV | $Hr^{-1}$ | 0.6 |
| Hydrogen Partial Pressure | $Kg/cm^2$ (g) | 60.0 |
| Temperature | ° C. | 385.0 |
| Hydrogen to Oil Ratio | $Sm^3/m^3$ | 566 |

Because of the severity of the process, about 19 wt % of the VGO is converted to distillates, naphtha, and diesel. The product yield from the hydrotreater is summarized below. The hydrodesulfurized VGO is sent to the FCC unit for conversion. Due to the low level of sulfur in the hydrodesulfurized VGO, the cycle oils produced will have low levels of sulfur (that is, the hydrotreated LCO results in a LCO with 0.3-0.7 wt % sulfur), which in turn will be easier to desulfurize in the oxidation step, as shown in Table 7 (in other words, the remaining sulfur compounds are in the form of alky derivatives of dibenzothiophene molecules, which are very reactive in oxidative desulfurization, but very refractory in hydrotreating).

TABLE 7

Hydrotreater Product Yield

| | wt % |
|---|---|
| $H_2S$ | 2.9 |
| $NH_3$ | 0.2 |
| $C_1$-$C_4$ | 0.7 |
| Naphtha | 2.4 |
| Diesel | 13.3 |
| Hydrodesulfurized VGO | 81.4 |
| Total | 100.9 |

Figure 5:
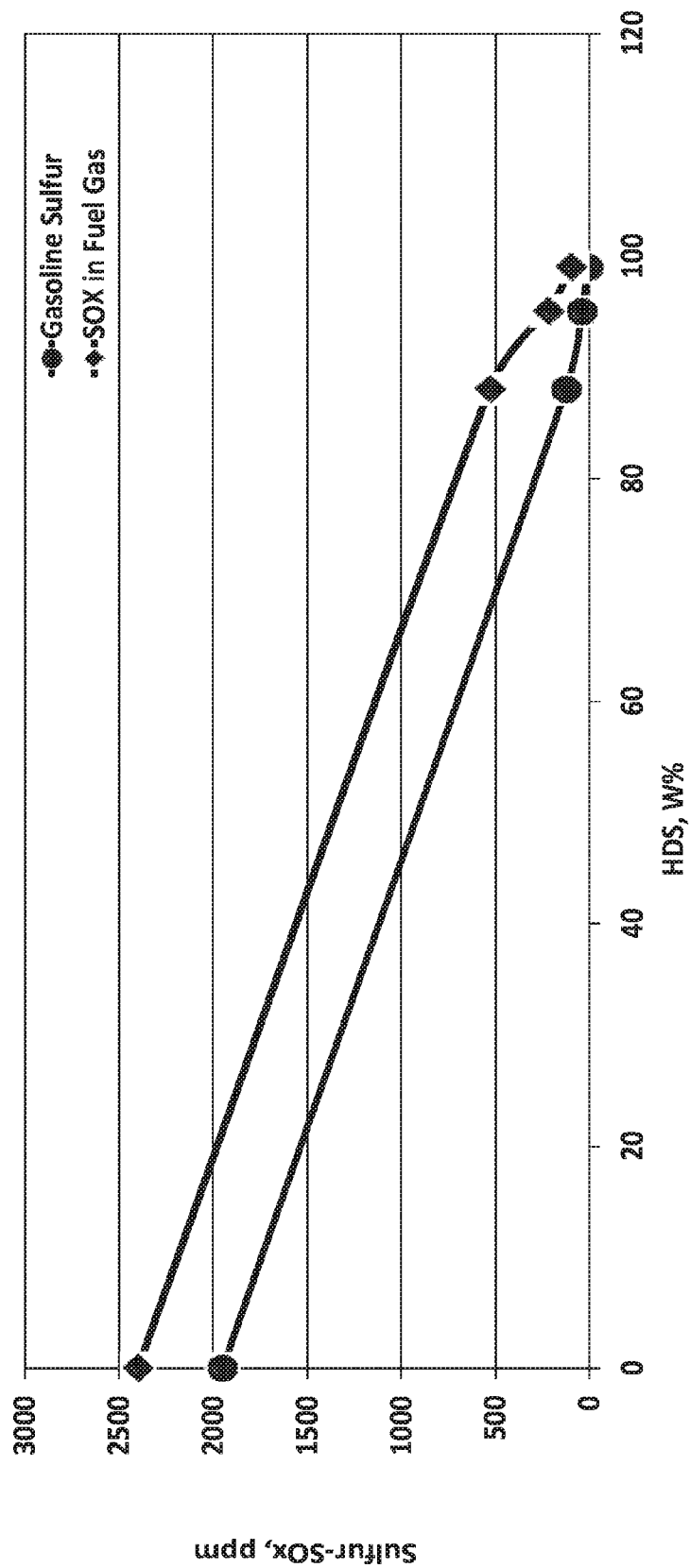
FIG. 5 shows an effect of hydrotreating on FCC performance.

FIG. 5 shows an effect of hydrotreating on FCC performance. FIG. 5 illustrates that hydrotreating may substantially impact gasoline quality (that is, the impact of hydrodesulfurization (HDS) level on gasoline and $SO_X$ emissions). As further shown in FIG. 5, at above 90 wt % desulfurization levels, the gasoline sulfur content can be reduced to less than 100 ppmw levels. The $SO_X$ emissions from the FCC can also be reduced to less than 500 ppmw levels.

The operating conditions of the hydrotreater according to various embodiments are shown in Table 8.

TABLE 8

Hydrotreater Operating Conditions

| Variable | Range | Unit | Value |
|---|---|---|---|
| Temperature | Broad | ° C. | 300-450 |
| Temperature | Preferred | ° C. | 350-420 |
| Pressure | Broad | Bar | 50-200 |
| Pressure | Preferred | Bar | 60-80 |
| LHSV | Broad | Hours | 0.2-5.0 |
| LHSV | Preferred | Hours | 0.5-2.0 |
| Hydrogen Oil | Broad | L/L | 300-1500 |
| Hydrogen Oil | Preferred | L/L | 500-1000 |

It is believed that the methods and systems described herein will increase the amount of liquid hydrocarbons from aromatic sulfur, nitrogen compounds, and aromatic streams by linking an oxidative desulfurization and denitrogenation process with a fluid catalytic cracking unit. Furthermore, it is believed that there are not any efficient methods for disposing of the oxidation reaction byproducts (that is, the oxidized sulfur and nitrogen compounds). Embodiments provide a way of disposing of the oxidized sulfur and nitrogen compounds without having to dispose of the compounds.

Although the various embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed as from about one particular value to about another particular value. When such a range is expressed, it is to be understood that another embodiment is from the one particular value or to the other particular value, along with all combinations within said range.

That which is claimed:

1. A method of recovering components from a hydrocarbon feedstock, the method comprising:
   supplying the hydrocarbon feedstock to an oxidation reactor, the hydrocarbon feedstock comprising sulfur compounds and nitrogen compounds;

contacting the hydrocarbon feedstock with an oxidizing agent in the oxidation reactor under conditions sufficient to selectively oxidize sulfur compounds and nitrogen compounds present in the hydrocarbon feedstock to produce an oxidized hydrocarbon stream that comprises hydrocarbons, oxidized sulfur compounds, and oxidized nitrogen compounds;

separating the hydrocarbons, the oxidized sulfur compounds, and the oxidized nitrogen compounds in the oxidized hydrocarbon stream by solvent extraction with a non-acidic polar organic solvent, the non-acidic polar organic solvent being dimethylformamide, to produce an extracted hydrocarbon stream and a mixed stream, the mixed stream comprising the non-acidic polar organic solvent, the oxidized sulfur compounds, and the oxidized nitrogen compounds, wherein the extracted hydrocarbon stream has a lower concentration of sulfur compounds and nitrogen compounds than the hydrocarbon feedstock;

separating the mixed stream using a distillation column into a first recovered non-acidic polar organic solvent stream and a first residue stream, the first residue stream comprising the oxidized sulfur compounds and the oxidized nitrogen compounds;

supplying the first residue stream to a fluid catalytic cracking unit, the supplying further comprising feeding the first residue stream through a hydrotreater prior to supplying the first residue stream to the fluid catalytic cracking unit, the fluid catalytic cracking unit being operative to catalytically crack the oxidized sulfur and the oxidized nitrogen to produce regenerated catalyst and gaseous and liquid products and allow for recovery of hydrocarbons from the first residue stream;

supplying the extracted hydrocarbon stream to a stripper to produce a second recovered non-acidic polar organic solvent stream and a stripped hydrocarbon stream; and recycling the first recovered non-acidic polar organic solvent stream and the second non-acidic polar organic solvent stream to an extraction vessel for the separating the hydrocarbons, the oxidized sulfur compounds, and the oxidized nitrogen compounds in the oxidized hydrocarbon stream.

2. The method of claim 1, further comprising:
recycling at least a portion of the liquid products to the oxidation reactor to selectively oxidize sulfur compounds in the liquid products, the portion of the liquid products comprising at least one of light cycle oils and heavy cycle oils.

3. The method of claim 1, further comprising:
recycling a portion of the regenerated catalyst with a fluid catalytic cracking feedstream to the fluid catalytic cracking unit, wherein the recycling further comprises catalytically cracking the fluid catalytic cracking feedstream with the portion of the regenerated catalyst to recover the hydrocarbons from the first residue stream.

4. The method of claim 1, wherein the oxidant is selected from the group consisting of air, oxygen, peroxides, hydroperoxides, ozone, nitrogen oxides compounds, and combinations thereof.

5. The method of claim 1, wherein the contacting the hydrocarbon feedstock with an oxidizing agent occurs in the presence of a catalyst comprising a metal oxide having the formula $M_xO_y$, wherein M is an element selected from Groups IVB, VB, and VIB of the periodic table.

6. The method of claim 1, wherein the sulfur compounds comprise sulfides, disulfides, mercaptans, thiophene, benzothiophene, dibenzothiophene, alkyl derivatives of dibenzothiophene, or combinations thereof.

7. The method of claim 1, wherein the oxidation reactor is maintained at a temperature of between about 20 and about 350° C. and at a pressure of between about 1 and about 10 bars.

8. The method of claim 1, wherein the ratio of the oxidant to sulfur compounds present in the hydrocarbon feedstock is between about 4:1 and about 10:1.

9. The method of claim 1, wherein the non-acidic polar organic solvent has a Hildebrandt value of greater than about 19.

10. The method of claim 1, wherein the solvent extraction is conducted at a temperature of between about 20° C. and about 60° C. and at a pressure of between about 1 and about 10 bars.

11. The method of claim 1, further comprising:
supplying the extracted hydrocarbon stream to an adsorption column, the adsorption column being charged with an adsorbent suitable for the removal of oxidized compounds present in the extracted hydrocarbon stream, the adsorption column producing a high purity hydrocarbon product stream and a second residue stream, the second residue stream including a portion of the oxidized compounds.

12. The method of claim 11, further comprising:
supplying the second residue stream to the fluid catalytic cracking unit.

13. The method of claim 11, wherein the adsorbent is selected from the group consisting of activated carbon, silica gel, alumina, natural clays, silica-alumina, zeolites, and combinations of the same.

14. The method of claim 11, wherein the adsorbent is a polymer coated support, wherein the support has a high surface area and is selected from the group consisting of silica gel, alumina, silica-alumina, zeolites, and activated carbon, and the polymer is selected from the group consisting of polysulfone, polyacrylonitrile, polystyrene, polyester terephthalate, polyurethane, and combinations of the same.

15. The method of claim 1, wherein the supplying the first residue stream to the fluid catalytic cracking unit further comprises contacting the first residue stream with a fluid catalytic cracking feedstream in the presence of a catalyst to catalytically crack the fluid catalytic cracking feedstream to recover hydrocarbons from the first residue stream.

16. The method of claim 15, wherein the fluid catalytic cracking feedstream comprises vacuum gas oil, reduced crude, demetalized oil, whole crude, cracked shale oil, liquefied coal, cracked bitumen, heavy coker gas oils, light cycle oils, heavy cycle oils, clarified slurry oils, or combinations thereof.

17. A method of recovering components from a hydrocarbon feedstock, the method comprising:
supplying the hydrocarbon feedstock to an oxidation reactor, the hydrocarbon feedstock comprising sulfur compounds and nitrogen compounds;

contacting the hydrocarbon feedstock with an oxidizing agent in the oxidation reactor under conditions sufficient to selectively oxidize sulfur compounds and nitrogen compounds present in the hydrocarbon feedstock to produce an oxidized hydrocarbon stream that comprises hydrocarbons, oxidized sulfur compounds, and oxidized nitrogen compounds;

separating the hydrocarbons, the oxidized sulfur compounds, and the oxidized nitrogen compounds in the oxidized hydrocarbon stream by solvent extraction with a non-acidic polar organic solvent, the non-acidic polar organic solvent being dimethylformamide, to produce an extracted hydrocarbon stream and a mixed stream, the mixed stream comprising the non-acidic polar organic solvent, the oxidized sulfur compounds, and the oxidized nitrogen compounds, wherein the extracted hydrocarbon stream has a lower concentration of sulfur compounds and nitrogen compounds than the hydrocarbon feedstock;

separating the mixed stream using a distillation column into a first recovered non-acidic polar organic solvent stream and a first residue stream, the first residue stream comprising the oxidized sulfur compounds and the oxidized nitrogen compounds;

supplying the first residue stream to a fluid catalytic cracking unit, the fluid catalytic cracking unit being operative to catalytically crack the oxidized sulfur and the oxidized nitrogen to produce regenerated catalyst and gaseous and liquid products and allow for recovery of hydrocarbons from the first residue stream;

contacting the first residue stream with a fluid catalytic cracking feedstream in the presence of a catalyst to catalytically crack the fluid catalytic cracking feedstream to recover hydrocarbons from the first residue stream;

supplying the first residue stream contacted with the fluid catalytic cracking feedstream through a hydrotreater prior to supplying the first residue stream to the fluid catalytic cracking unit;

supplying the extracted hydrocarbon stream to a stripper to produce a second recovered non-acidic polar organic solvent stream and a stripped hydrocarbon stream; and recycling the first recovered non-acidic polar organic solvent stream and the second non-acidic polar organic solvent stream to an extraction vessel for the separating the hydrocarbons, the oxidized sulfur compounds, and the oxidized nitrogen compounds in the oxidized hydrocarbon stream.

18. The method of claim 17, further comprising:
recycling at least a portion of the liquid products to the oxidation reactor to selectively oxidize sulfur compounds in the liquid products, the portion of the liquid products comprising at least one of light cycle oils and heavy cycle oils.

19. The method of claim 17, further comprising:
recycling a portion of the regenerated catalyst with the fluid catalytic cracking feedstream to the fluid catalytic cracking unit, wherein the recycling further comprises catalytically cracking the fluid catalytic cracking feedstream with the portion of the regenerated catalyst to recover the hydrocarbons from the first residue stream.

20. The method of claim 17, wherein the oxidant is selected from the group consisting of air, oxygen, peroxides, hydroperoxides, ozone, nitrogen oxides compounds, and combinations thereof.

21. The method of claim 17, wherein the contacting the hydrocarbon feedstock with an oxidizing agent occurs in the presence of a catalyst comprising a metal oxide having the formula $M_xO_y$, wherein M is an element selected from Groups IVB, VB, and VIB of the periodic table.

22. The method of claim 17, wherein the sulfur compounds comprise sulfides, disulfides, mercaptans, thiophene, benzothiophene, dibenzothiophene, alkyl derivatives of dibenzothiophene, or combinations thereof.

23. The method of claim 17, wherein the oxidation reactor is maintained at a temperature of between about 20 and about 350° C. and at a pressure of between about 1 and about 10 bars.

24. The method of claim 17, wherein the ratio of the oxidant to sulfur compounds present in the hydrocarbon feedstock is between about 4:1 and about 10:1.

25. The method of claim 17, wherein the non-acidic polar organic solvent has a Hildebrandt value of greater than about 19.

26. The method of claim 17, wherein the solvent extraction is conducted at a temperature of between about 20° C. and about 60° C. and at a pressure of between about 1 bar and about 10 bars.

27. The method of claim 17, further comprising:
supplying the extracted hydrocarbon stream to an adsorption column, the adsorption column being charged with an adsorbent suitable for the removal of oxidized compounds present in the extracted hydrocarbon stream, the absorption column producing a high purity hydrocarbon product stream and a second residue stream, the second residue stream including a portion of the oxidized compounds.

28. The method of claim 27, further comprising:
supplying the second residue stream to the fluid catalytic cracking unit.

29. The method of claim 27, wherein the adsorbent is selected from the group consisting of activated carbon, silica gel, alumina, natural clays, silica-alumina, zeolites, and combinations of the same.

30. The method of claim 27, wherein the adsorbent is a polymer coated support, wherein the support has a high surface area and is selected from the group consisting of silica gel, alumina, and activated carbon, and the polymer is selected from the group consisting of polysulfone, polyacrylonitrile, polystyrene, polyester terephthalate, polyurethane, silica-alumina, zeolites, and combinations of the same.

31. The method of claim 17, wherein the first residue stream and the fluid catalytic cracking feedstream are present in a weight ratio of the catalyst to the first residue stream and the fluid catalytic cracking feedstream ranges from about 1 to about 15.

32. The method of claim 17, wherein the fluid catalytic cracking feedstream comprises vacuum gas oil, reduced crude, demetalized oil, whole crude, cracked shale oil, liquefied coal, cracked bitumen, heavy coker gas oils, light cycle oils, heavy cycle oils, clarified slurry oils, or combinations thereof.

33. The method of claim 17, wherein the contacting the first residue stream with a fluid catalytic cracking feedstream in the presence of a catalyst occurs in a temperature range of about 300° C. to about 650° C.

34. The method of claim 17, wherein the contacting the first residue stream with a fluid catalytic cracking feedstream in the presence of a catalyst occurs in a residence time of about 0.1 second to about 10 minutes.

35. The method of claim 17, further comprising:
separating lower boiling components and catalyst particles from the first residue stream and the fluid catalytic cracking feedstream; and
regenerating at least a portion of the catalyst particles.

36. The method of claim 35, wherein the regenerating the at least a portion of the catalyst particles includes contacting the portion of the catalyst particles with a water-free oxygen-containing gas in a fluidized bed operated at conditions to produce regenerated catalyst and gaseous products comprising carbon monoxide and carbon dioxide and liquid products.

* * * * *